US00RE44335E

(19) United States
(12) Reissued Patent
Park et al.

(10) Patent Number: US RE44,335 E
(45) Date of Reissued Patent: Jul. 2, 2013

(54) SYSTEM AND METHOD FOR PROVIDING TERRESTRIAL DIGITAL BROADCASTING SERVICE USING SINGLE FREQUENCY NETWORK

(75) Inventors: Sung-Ik Park, Daejeon (KR); Yong-Tae Lee, Daejeon (KR); Seung-Won Kim, Daejeon (KR); Chieteuk Ahn, Daejeon (KR)

(73) Assignee: Electronics and Telecommunications Research Institute, Daejeon (KR)

(21) Appl. No.: 13/187,660

(22) Filed: Jul. 21, 2011

Related U.S. Patent Documents

Reissue of:
(64) Patent No.: 7,564,905
Issued: Jul. 21, 2009
Appl. No.: 10/734,405
Filed: Dec. 11, 2003

(30) Foreign Application Priority Data

Dec. 20, 2002 (KR) ..... 10-2002-0081934
Feb. 20, 2003 (KR) ..... 10-2003-0010624

(51) Int. Cl.
*H04L 27/00* (2006.01)

(52) U.S. Cl.
USPC . 375/259; 375/145; 375/240.01; 375/240.28; 375/265; 375/293; 375/316; 725/148; 725/43; 348/725; 348/724; 348/723; 371/792; 371/795; 371/796; 714/792

(58) Field of Classification Search
USPC ..... 375/260, 259, 145, 240.01, 240.28, 375/265, 293, 316; 725/148, 43; 348/725, 348/724, 723; 371/792, 796; 714/792
See application file for complete search history.

(56) References Cited

U.S. PATENT DOCUMENTS

| | | | | |
|---|---|---|---|---|
| 5,802,107 | A * | 9/1998 | Willming | 375/265 |
| 6,744,822 | B1 * | 6/2004 | Gaddam et al. | 375/265 |
| 7,100,182 | B2 * | 8/2006 | Choi et al. | 725/20 |
| 7,315,579 | B2 * | 1/2008 | Karaoguz | 375/265 |
| 7,564,905 | B2 * | 7/2009 | Park et al. | 375/259 |
| 2002/0140867 | A1 | 10/2002 | Weiss | |

* cited by examiner

*Primary Examiner* — Shuwang Liu
*Assistant Examiner* — Helene Tayong
(74) *Attorney, Agent, or Firm* — William Park & Associates Patent Ltd.

(57) ABSTRACT

Provided is a system and method for terrestrial digital broadcasting service using a single frequency network without additional equipment. The system and method synchronizes input signals into transmitting stations by inserting a transmission synchronization signal into a header of TS periodically, and solves the problematic ambiguity of the trellis encoder by including a trellis encoder switching unit separately and initializing a memory of the trellis encoder. The terrestrial digital broadcasting system includes: a broadcasting station for multiplexing video, voice and additional signals into transport stream (TS) and transmitting the TS to the transmitting stations and a transmitting stations for receiving the TS and broadcast the TS to receiving stations through a single frequency network.

20 Claims, 9 Drawing Sheets

SYSTEM AND METHOD FOR PROVIDING TERRESTRIAL DIGITAL BROADCASTING SERVICE USING SINGLE FREQUENCY NETWORK

Matter enclosed in heavy brackets [ ] appears in the original patent but forms no part of this reissue specification; matter printed in italics indicates the additions made by reissue.

FIELD OF THE INVENTION

The present invention relates to a system and method for providing terrestrial digital broadcasting service using a single frequency network; and, more particularly, to a system and method where a plurality of transmitting stations provide a terrestrial digital broadcasting service through a single frequency network.

DESCRIPTION OF RELATED ART

In general digital broadcasting service systems, transmitting stations are positioned based on the natural configurations, natural features and broadcasting coverage, and broadcasting data are transmitted in a frequency band allocated to each transmitting station, which is called a plural frequency network mode.

FIG. 1 is a schematic diagram illustrating a typical terrestrial digital broadcasting service system. Referring to FIG. 1, a broadcasting station 100 multiplexes video, voice and additional data signals and transmits multiplexed signals in the form of a predetermined type of packet, i.e., transport stream (TS), to a first transmitting station 130 and a second transmitting station 170. The first transmitting station 130 and the second transmitting station 170 transmit broadcasting signals on transmission frequency A and transmission frequency B, respectively.

FIG. 2 is a block diagram showing a broadcasting station and transmitting stations of FIG. 1. Referring to FIG. 2, the broadcasting station 100 inputs a video signal 102 which is compressed by using a Motion Picture Experts Group (MPEG-2), a voice signal 104 compressed by using a dolby AC-3, and a control signal 106 for controlling a transmitting station to a multiplexer 108. The multiplexer 108 packetizes the signals to generate TS, which is a digital data stream. The TS is transmitted to a transmitting station through a studio to transmitter link (STL) 110. The first transmitting station 130 broadcasts the signals, which are transmitted through the STL 110, to a first broadcast coverage 150.

FIG. 3 is a block diagram depicting a channel encoder of FIG. 2. A channel encoder 132 includes a randomizer 133, a reed-solomon (RS) encoder 134, an interleaver 135, and a trellis encoder 136. The randomizer 133 randomizes the TS transmitted from the STL 110. The RS encoder 134 performs outer-encoding on the randomized data. The interleaver 135 interleaves the data in order to disperse burst error generated in a transmission channel. The trellis encoder 136 includes a trellis coded modulation (TCM) encoder 137 and a precoder 138 that process signals.

The conventional broadcasting service system requires a great deal of frequency resources, because the same broadcast data is broadcasted on a plurality of frequencies. Since the same frequency cannot be used in the regions of short distance due to the generation of interference, the conventional technology is very inefficient in the aspect of using frequencies. Therefore, it is desirable to use single frequency network.

However, if digital television (TV) broadcasting is operated using a conventional digital TV transmission system, many problems occur. First, since the distances and channel environments between the broadcasting station 100 and the respective transmitting stations are different, a first transmitting station receives the TS which is different from that received by a second transmitting station at the same time.

In other words, since the first transmitting station 130 and the second transmitting station 170 are not synchronized temporally, the starting point of channel modulation is different in each of the transmitting stations 130 and 170. As a result, the output signals are not the same. Therefore, when the signals are broadcasted on a single frequency network, the output signals cannot be discriminated. That is, if the signals transmitted from a plurality of transmitting stations are not the same, the signals become noise to each other in the same frequency band. These noise signals are not discriminated in a receiving station.

Secondly, because the initial states of the memories of a TCM encoder 137 and a precoder 138 in a transmitting station are not the same, even if the same signal is inputted into different transmitting stations, different signals are outputted from the transmitting stations. This phenomenon is called ambiguity of a trellis encoder.

To solve the problems, a method of "Transmitter Synchronization for Terrestrial Broadcasting" is suggested as an Advanced Television Systems Committee (ATSC) standard by Merrill Weiss Group. The ATSC is established to deliberate advanced television (ATV), which is a next-generation terrestrial television technology.

According to the "Transmitter Synchronization for Terrestrial Broadcasting," the broadcasting station matches the periods of signals inputted to transmitting stations by transmitting a cadence signal (CS) periodically, and solves the problematic ambiguity of the trellis encoder by transmitting a trellis code state packet (TCSP) signal separately. The TCSP signal is a signal carrying information on the memory of the trellis encoder.

However, the method causes another problems that the broadcasting station requires complicated additional equipment, such as a data randomizer, an RS encoder, a data interleaver, a trellis encoder, a CS adder and a TCSP adder to transmit a TCSP signal, and that the portion of a control signal in a TS is increased and, thus, STL load is weighed down.

SUMMARY OF THE INVENTION

It is, therefore, an object of the present invention to provide a system and method for providing digital television broadcasting service using a single frequency network in which input signals into transmitting stations are synchronized.

In accordance with an aspect of the present invention, there is provided a terrestrial digital broadcasting system, including: a broadcasting station for multiplexing video, voice and additional signals into transport stream (TS) and transmitting the TS to the transmitting stations; and a transmitting stations for receiving the TS and broadcasting the TS to receiving stations through a single frequency network, wherein the broadcasting station includes: a transmission synchronization unit for inserting a field synchronization header to the TS in a predetermined data field period N, and wherein the transmitting stations include: a transmission synchronization detecting unit for synchronizing the TS transmitted from the broadcasting station based on the field synchronization header; and a trellis encoding unit for generating initialization symbols of a predetermined length in a predetermined data field period M and synchronizing the TS outputted to the receiving stations.

In accordance with another aspect of the present invention, there is provided a terrestrial digital broadcasting method using a single frequency network, including the steps of: a) inserting a field synchronization header to transport stream (TS) transmitted to a plurality of transmitting stations in a predetermined data field period N in a broadcasting station; b) detecting the field synchronization header and synchronizing starting points of the TS inputted to each transmitting station in the transmitting stations; c) synchronizing the TS outputted to receiving stations by generating initialization symbols of a predetermined length every predetermined data field period M with respect to the inputted signal; and d) broadcasting the synchronized TS to the receiving stations.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
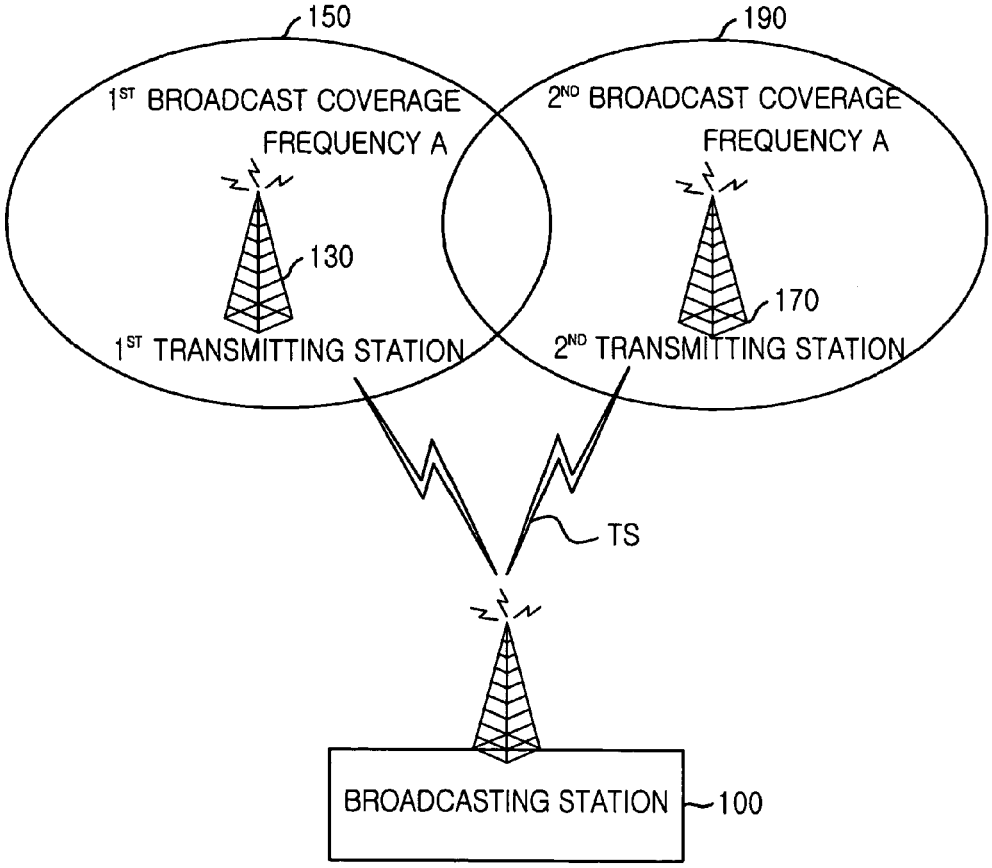
FIG. 1 is a schematic diagram illustrating a typical terrestrial digital broadcasting service system.
Figure 2:
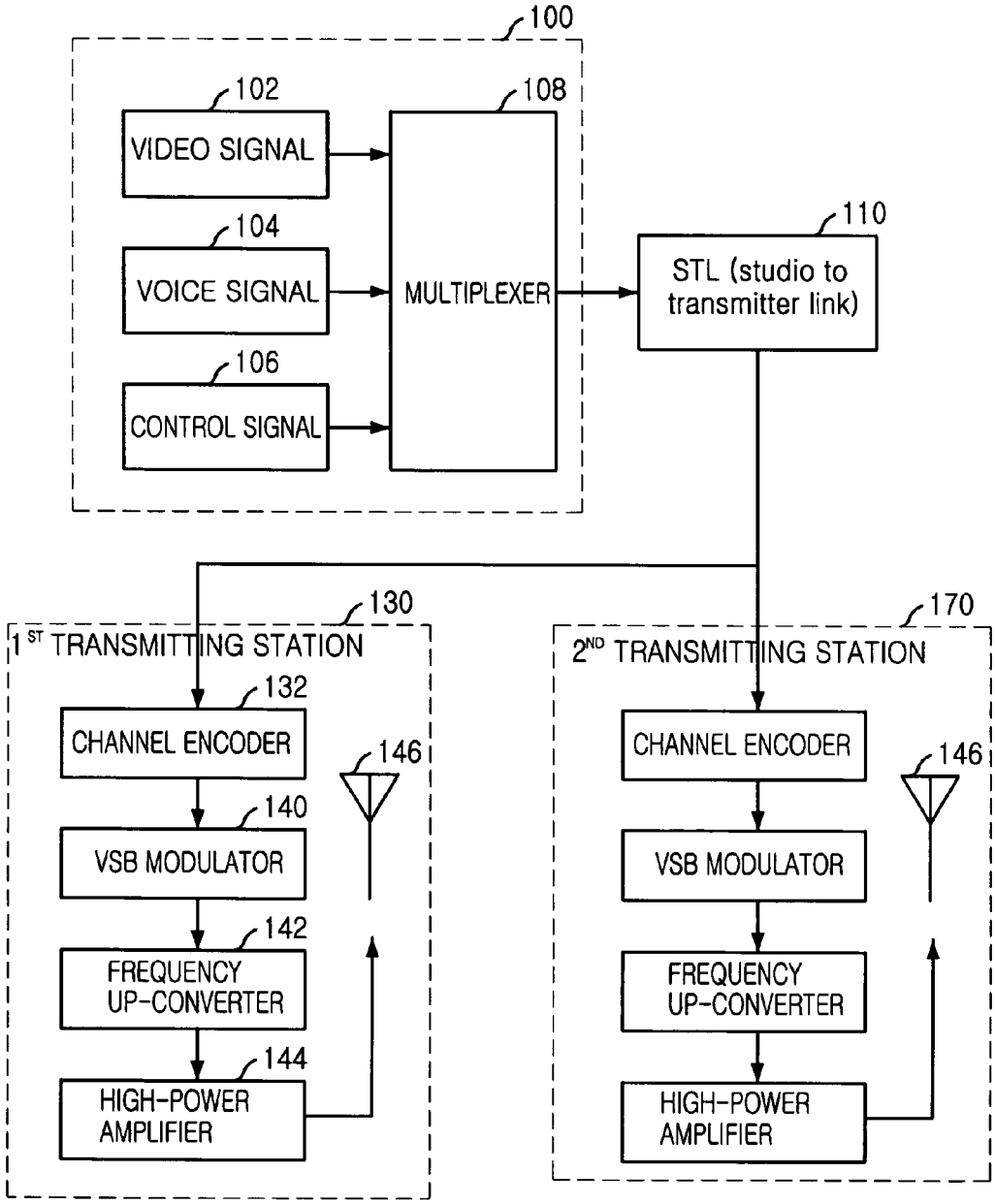
FIG. 2 is a block diagram showing a broadcasting station and transmitting stations of FIG. 1.
Figure 3:
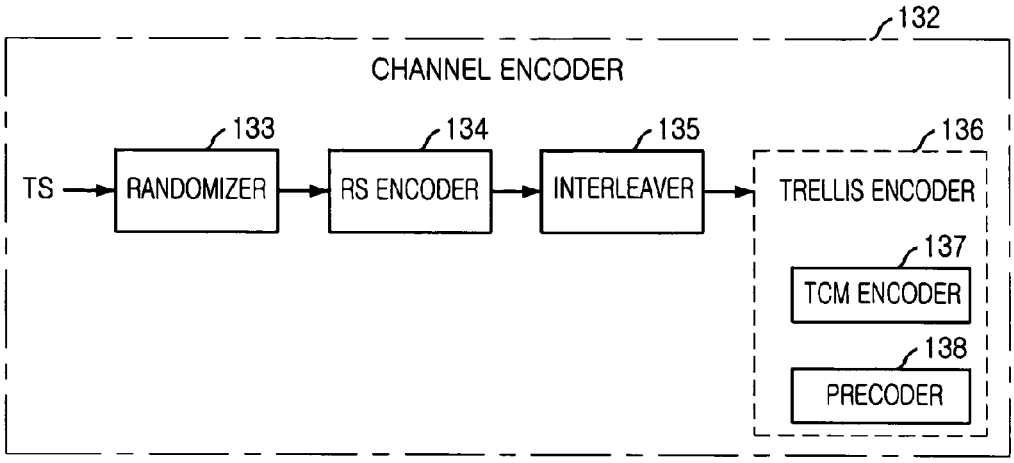
FIG. 3 is a block diagram depicting a channel encoder of FIG. 2.
Figure 4:
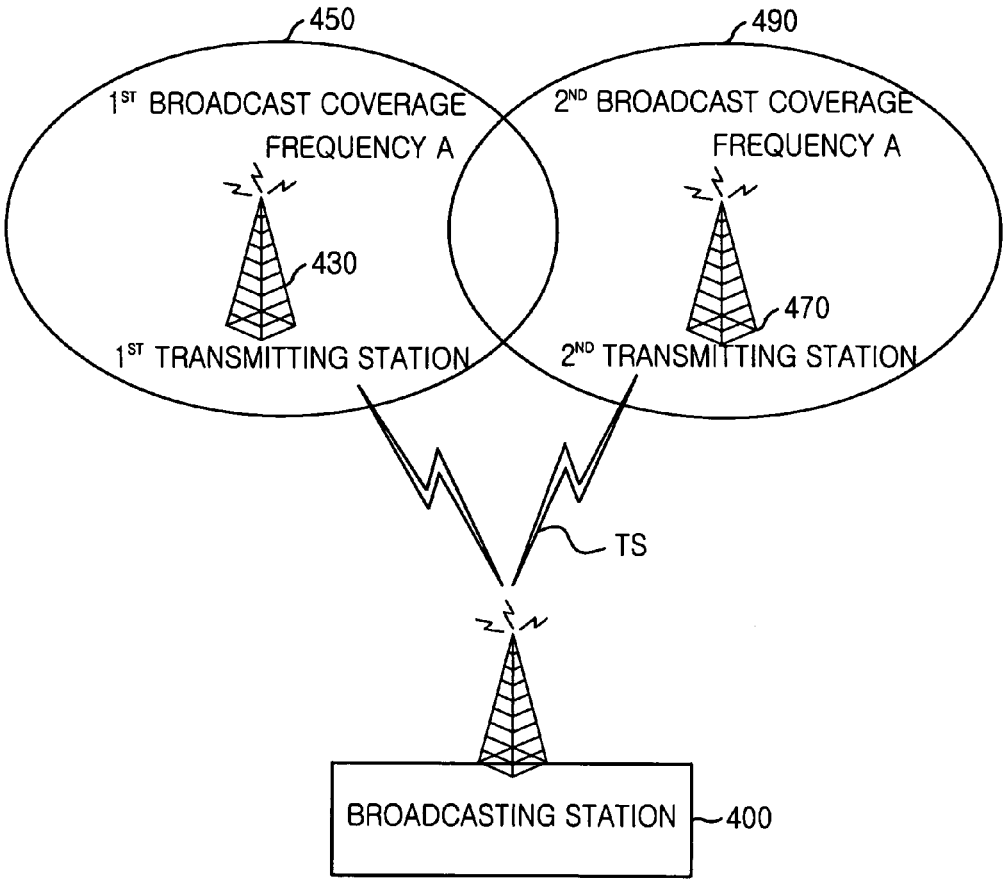
FIG. 4 is a schematic diagram illustrating a terrestrial digital broadcasting service system using a single frequency network in accordance with a preferred embodiment of the present invention.

FIG. 4 is a schematic diagram illustrating a terrestrial digital broadcasting service system using a single frequency network in accordance with a preferred embodiment of the present invention. Referring to FIG. 4, a broadcasting station 400 multiplexes video, voice and additional data signals to generate transport stream (TS) and transmits TS to a first transmitting station 430 and a second transmitting station 470. The first transmitting station 430 and the second transmitting station 470 process the TS and broadcast the TS on the same transmission frequency A to a first broadcast coverage 450 and a second broadcast coverage 490.

Figure 5:
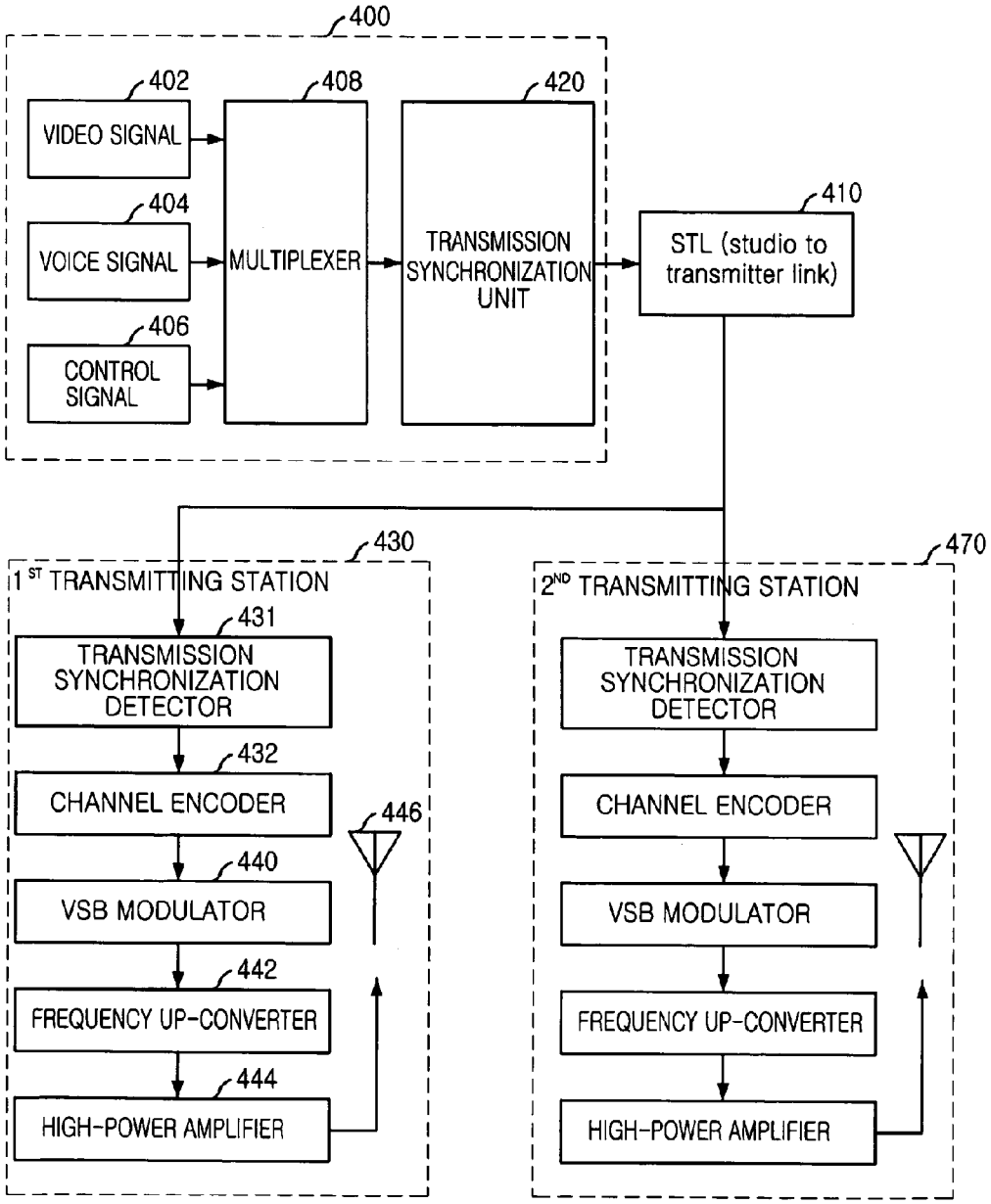
FIG. 5 is a block diagram showing a broadcasting station and transmitting stations of FIG. 4.

The terrestrial digital broadcasting system using a single frequency network, which is an American style, is illustrated in FIG. 5. FIG. 5 is a block diagram showing a broadcasting station and transmitting stations of FIG. 4 in detail. The broadcasting station includes a multiplexer 408 and a transmission synchronization unit. The transmitting station 430 includes a transmission synchronization detector 431, a channel encoder 432, a vestigial sideband (VSB) modulator 440, a frequency up-converter 442 and a high-power amplifier 444.

The broadcasting station 400 inputs a video signal 402 which is compressed by using a Motion Picture Experts Group 2 (MPEG-2), a voice signal 404 compressed by using a dolby AC-3, and a control signal 406 for controlling a transmitting station to a multiplexer 408 to generate TS, which is a digital data stream.

Meanwhile, a transmission synchronization unit 420 of the broadcasting station 400 inputs a predetermined transmission synchronization signal, which will be described later, to a particular header of the TS, periodically. According to an Advanced Television Systems Committee A.53 (ATSC A.53) standard, a value of $47_{16}$ is inserted as a header information to a header of TS. Here, the $47_{16}$ value is a hexadecimal number.

However, in the present invention, a transmission synchronization unit 420 inputs a value of $B8_{16}$, which is obtained by inversing the value of $47_{16}$ on a bit by bit basis, as a field synchronization header every N data fields periodically. The data field period, N, is a natural number that can be adjusted according to communication environment flexibly. That is, if the communication environment is in good condition, N can be a large number. Otherwise, if it is in poor condition, a field synchronization signal should be transmitted frequently by making the N value small. It is obvious to those skilled in the art that the N value can be changed variously according to the communication environment of the terrestrial digital broadcasting system. Therefore, the present invention should be understood not limited to a particular N value.

Figure 6:
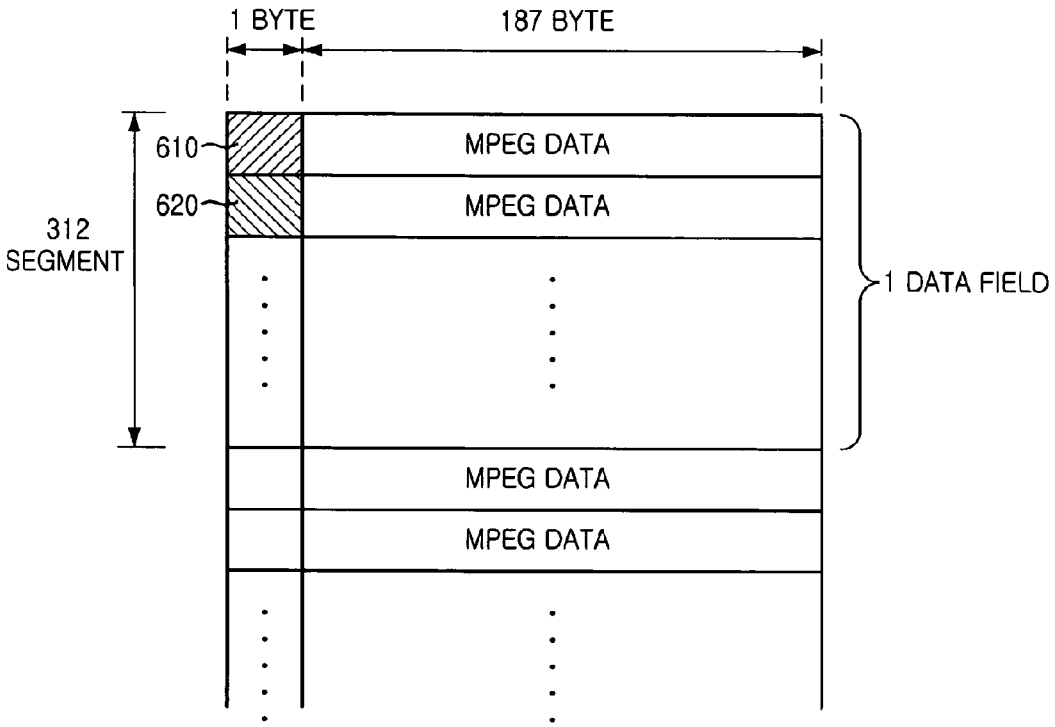
FIG. 6 is a diagram showing a structure of a transport stream having a field synchronization signal inserted thereto in accordance with the preferred embodiment of the present invention.

FIG. 6 is a diagram showing a structure of a transport stream data having a field synchronization signal inserted thereto in accordance with the preferred embodiment of the present invention. Referring to FIG. 6, the value of $B8_{16}$ is included in a first header 610 of the N-period data field as a field synchronization header. Since N is assumed to be 1 in this embodiment of the present invention, the field synchronization header is inserted every one data field, which is formed of 312 segments. If N is not 1, the field synchronization header is inserted every N data fields according to the N value.

Into the other segment headers 620, the value of $47_{16}$ is stored as header information just as the prior art. The number of the other segment headers is defined as X, X being a natural number larger than 1. Since N is 1 in the present embodiment, X becomes 311.

The field synchronization header synchronizes the input signals into the transmitting stations. In this embodiment, since the first transmitting station 430 and the second transmitting station 470 have different distances from the broadcasting station 400 and they are in different communication environments, different signals are inputted into the first and second transmitting stations 430 and 470 at the same time. In order to transmit the same output signals, the starting points of data for processing should be the same. The starting points of data for processing can be synchronized at the transmitting stations, as the transmission synchronization unit 420 inserts the field synchronization header. TS with a field synchronization signal inserted thereto is transmitted to the transmitting stations through a studio to transmitter (STL) 410.

Meanwhile, the first transmitting station 430 receives the TS and transmits it to a transmission synchronization detector 431. If the value of $B8_{16}$, which is a field synchronization header, and X data segment headers, $47_{16}$, are detected, the transmission synchronization detector 431 recognizes that valid TS are being received. Then, channel encoding and subsequent signal processing are carried out from a data segment having a field synchronization header $B8_{16}$.

Since the same operation is performed in the second transmitting station 470, synchronization is maintained even though there is more or less temporal difference from the signal inputted to the first transmitting station 430 and the starting point of data for processing can be synchronized.

Figure 7:
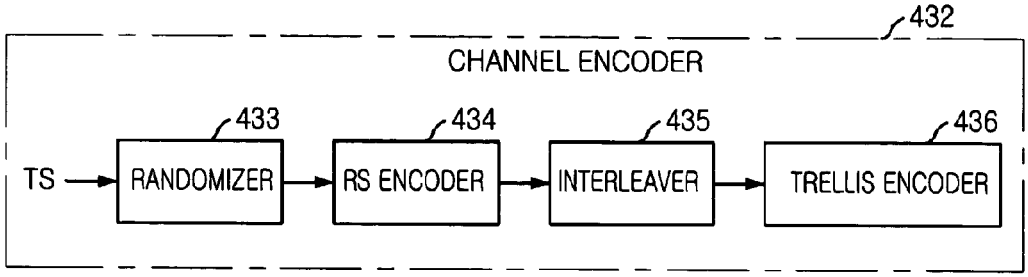
FIG. 7 is a block diagram describing a channel encoder of FIG. 5.

The channel encoding process of the present invention is performed in a channel encoder 432, the structure of which is shown in FIG. 7. FIG. 7 is a block diagram describing a channel encoder of FIG. 5. The channel encoder 432 includes a randomizer 433, a reed-solomon (RS) encoder 434, an interleaver 435 and a trellis encoder 436. The randomizer 433 randomizes TS. The RS encoder 434 performs outer encoding on the randomized data. The interleaver 435 disperses burst errors generated on a transmission channel. The trellis encoder 436 performs inner encoding on the interleaved data. The trellis encoder 436 makes the transmitting stations transmit the same output signal, which is different from the conventional technology.

Figure 8:
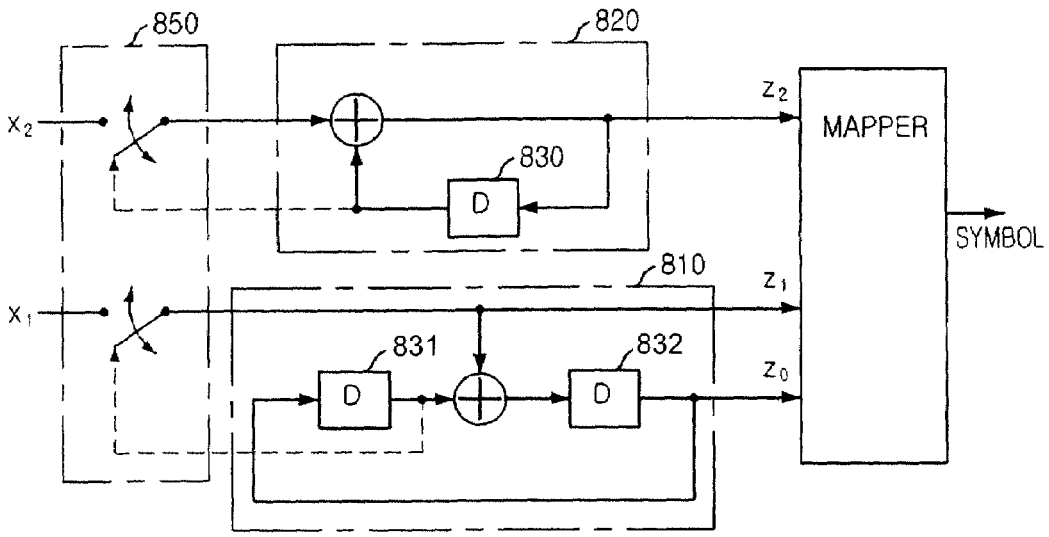
FIG. 8 is a schematic diagram illustrating the internal structure of a trellis encoder shown in FIG. 7.

FIG. 8 is a schematic diagram illustrating the internal structure of a trellis encoder shown in FIG. 7. The trellis encoder 436 includes a trellis coded modulation (TCM) encoder 810, a precoder 820, a memory 831 and 832 of the TCM encoder 810 and a memory 830 of precoder 820, and a switching unit 850.

The TCM encoder 810 and the precoder 820 process input signals $X_1$ and $X_2$ in the conventional way and generate symbols. Here, each of the memory 830-832 is initialized at every M data fields, M being a natural number. The initialization is performed switching the input signals $X_1$ and $X_2$ in a switching unit 850.

That is, when the switching is performed as shown in the wave lines of the drawing, the signals of each of the memory 830-832 are used for performing exclusive OR instead of the input signals $X_1$ and $X_2$. This way, each of the memory 830-832 can be initialized to a '0'state, which is a null state. If each of the memory 830-832 of the trellis encoder 436 is initialized in each transmitting station, the subsequent data fields are generated in the same symbols.

The number M of data fields is a natural number that can be adjusted flexibly according to the communication channel environment between the transmitting station and each receiving stations. If the transmission channel environment is in good condition, M can be a large number. Otherwise, if it is in poor condition, M can be a small number. It is obvious to those skilled in the art that the value of M can be changed variously according to the communication environment of the terrestrial digital broadcasting system. Therefore, the present invention should be understood not limited to a particular M value.

Each of the memory 830-832 is initialized periodically by the switching operation in the switching unit 850. If the M values of all transmitting stations are the same, the trellis encoders 436 of the transmitting stations are initialized in the same period. Eventually, the signals inputted into the transmitting stations are the same, as described in FIGS. 5 and 6, and the signals outputted from the transmitting stations are the same, as described in FIGS. 7 and 8. Therefore, terrestrial broadcasting using a single frequency network can be operated.

Meanwhile, an initial symbol is inserted in a predetermined period, i.e., a data field period M, instead of a data symbol in the switching unit 850. That is, instead of input signals $X_1$ and $X_2$, signals stored in each of the memory 830-832 are inputted to an input terminal to generate an initialization symbol. When each of the memory 830-832 is initialized, two initialization symbols are generated for one trellis encoder 436. Meanwhile, in the ATSC A.53, 12 trellis encoders are used during the channel encoding process. Thus, a total of 24 initialization symbols are generated and inserted in a period of M.

Figure 9:
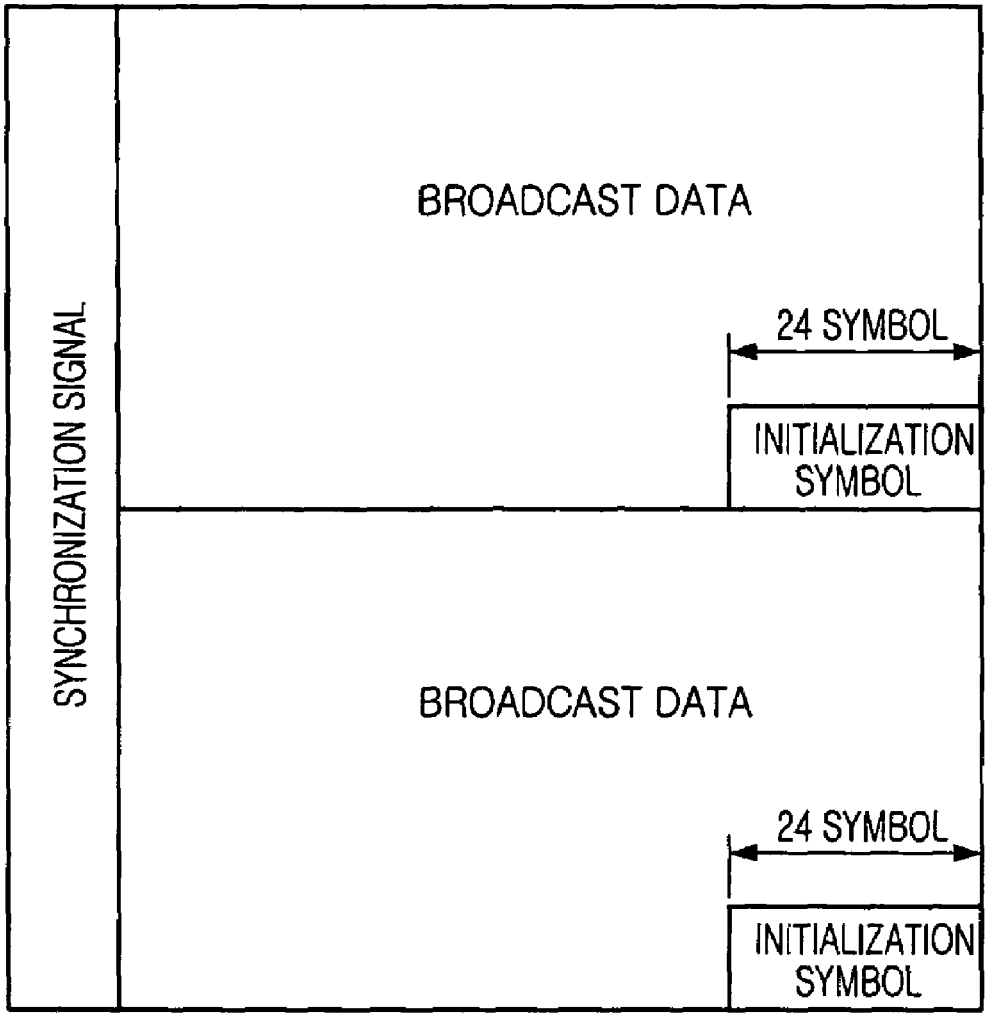
FIG. 9 is a diagram depicting a structure of a transport stream having an initializing symbol inserted thereto in accordance with the preferred embodiment of the present invention.

FIG. 9 is a diagram depicting a structure of a transport stream data with an initializing symbol inserted thereto in accordance with the preferred embodiment of the present invention. Referring to FIG. 9, 24 initialization symbols are inserted in a period of M.

In the section of 24 initialization symbols, an error occurs. This error, however, can be corrected in an error correction unit of the receiving station. The longer the period, i.e., M, becomes, the smaller error occurs.

When the channel encoding is completed in the channel encoder, the broadcast data are transmitted to each broadcast coverage through a VBS modulator 440, a frequency upconverter 442, and a high-power amplifier 444. As each process is the same as that of the conventional technology, further description will be omitted.

As described above, the input signals into a plurality of transmitting stations are synchronized by inserting a field synchronization signal to TS which is inputted to the transmitting station in a predetermined period, the period being N data fields. The output signals of the transmitting stations are synchronized by initializing the memory of the trellis encoder of the transmitting station in a predetermined period, the period being M data fields.

Therefore, the input signals into the transmitting stations are all synchronized and the output signals therefrom are all synchronized. Therefore, all the transmitting stations can provide terrestrial digital broadcasting using the same single frequency. Since a frequency can be reused in nearby regions, the frequency utility efficiency can be increased and, also, diversity gain can be acquired by using a plurality of transmitting stations.

While the present invention has been described with respect to certain preferred embodiments, it will be apparent to those skilled in the art that various changes and modifications may be made without departing from the scope of the invention as defined in the following claims.

What is claimed is:

1. A terrestrial digital broadcasting system, comprising:

a broadcasting station for multiplexing video, voice and additional signals into transport stream (TS) and transmitting the TS to transmitting stations; and a plurality of transmitting stations for receiving the TS and broadcasting the TS to receiving stations through a single frequency network, wherein the broadcasting station includes:

a transmission synchronization means for inserting a field synchronization header to the TS in a predetermined data field period N, wherein N is a natural number, and wherein the plurality of transmitting stations include:

a transmission synchronization detecting means for synchronizing the TS transmitted from the broadcasting station based on the field synchronization header; and a trellis encoding means for generating initialization symbols of a predetermined length in a predetermined data field period M and synchronizing the TS outputted to the receiving stations, and M is a natural number, wherein the trellis encoding means includes:

a first switching unit for initializing output values of a trellis coded modulation (TCM) encoder and a memory of the TCM encoder performing switching to values stored in the memory of the TCM encoder instead of input signals to the TCM encoder every M period, wherein the TCM encoder includes a first feedback loop to initialize the memory of the TCM encoder after receiving the values stored in the memory of the TCM encoder from the first switching unit;

a second switching unit for initializing output values of a precoder and a memory of the precoder by performing switching to values stored in the memory of the precoder instead of input signals to the precoder every M period, wherein the precoder includes a second feedback loop to initialize the memory of the precoder after receiving the values stored in the memory of the precoder from the second switching unit; and wherein when the memory of the precoder is initialized by the second feedback loop, the trellis encoding means generates two initialization symbols in the predetermined data field period M.

2. The system as recited in claim 1, wherein the field synchronization header is acquired by reversing a first segment header of data fields of an N period on a bit basis, wherein N is a natural number.

3. The system as recited in claim 2, wherein the transmission synchronization detecting means recognizes that valid TS is being received, if a field synchronization header of a $B8_{16}$ value is detected in the first segment header and a value of $47_{16}$ is detected in the segment headers of the other data fields.

4. The system as recited in claim 1, wherein the N value is adjusted based on the communication channel environment between the broadcasting station and the plurality of transmitting stations, and the M value is adjusted based on the communication channel environment between the broadcasting station and the plurality of transmitting stations.

5. A terrestrial digital broadcasting method using a single frequency network, comprising the steps of:

a) inserting a field synchronization header to transport stream (TS) transmitted to a plurality of transmitting stations in a predetermined data field period N in a broadcasting station, wherein N is a natural number;

b) detecting the field synchronization header and synchronizing starting points of the TS inputted to each transmitting station in the plurality of transmitting stations;

c) synchronizing the TS outputted to receiving stations by generating initialization symbols of a predetermined length every predetermined data field period M with respect to the inputted signal, and M is a natural number, wherein the initialization symbols are generated by performing switching to input values stored in a memory of a trellis coded modulation (TCM) encoder, the TCM encoder including a first feedback loop to initialize a memory of the TCM encoder after receiving the input values stored in the memory of the TCM encoder from the performed switching, and input values stored in a memory of a precoder instead of the inputted signal, the precoder including a second feedback loop to initialize a memory of the precoder after receiving the input values stored in the memory of the precoder from the performed switching, and when the memory of the precoder is initialized by the second feedback loop, two initialization symbols are generated in every predetermined data field period M; and d) broadcasting the synchronized TS to the receiving stations.

6. The method as recited in claim 5, wherein the field synchronization header is acquired by reversing a first segment header of data fields of an N period on a bit basis.

7. The method as recited in claim 6, wherein in the step b), if a field synchronization header of a $B8_{16}$ value is detected in the first segment header of the N-period data fields and a field synchronization header of a $47_{16}$ value is detected in the headers of the other data segments, the transmitting station recognizes that valid TS is received and synchronizes the starting points of the TS inputted to each transmitting station by performing signal processing from a data field where the field synchronization header is detected.

8. The method as recited in claim 5, wherein a value of N is adjusted based on communication channel environment between the broadcasting station and the plurality of transmitting stations, and value of M is adjusted based on communication channel environment between the broadcasting station and the plurality of transmitting stations, wherein the values of N and M are natural numbers.

*9. A trellis encoder, comprising:*

*a precoder which includes one memory; a trellis coded modulation (TCM) encoder which includes two memories;*

*where the trellis encoder is configured to generate initialization symbols of a predetermined length in a predetermined data field period M and synchronize a transport stream outputted to receiving stations, where M is a natural number, wherein the trellis encoder includes:*

*a first switching unit for initializing output values of the trellis coded modulation (TCM) encoder and the memory of the TCM encoder performing switching to values stored in the memory of the TCM encoder instead of input signals to the TCM encoder every M period, wherein the TCM encoder includes a first feedback loop to initialize the memory of the TCM encoder after receiving the values stored in the memory of the TCM encoder from the first switching unit;*

*a second switching unit for initializing output values of the precoder and the memory of the precoder by performing switching to values stored in the memory of the precoder instead of input signals to the precoder every M period, wherein the precoder includes a second feedback loop to initialize the memory of the precoder after receiving the values stored in the memory of the precoder from the second switching unit; and*

*wherein when the memory of the precoder is initialized by the second feedback loop, the trellis encoder generates two initialization symbols in the predetermined data field period M.*

*10. The trellis encoder as recited in claim 9, wherein contents of the memories start to be initialized to zero as the first switching unit switches the content of the memory of the precoder and the second switching unit switches content of one of the memories of the TCM encoder.*

*11. The trellis encoder as recited in claim 10, wherein an operation to switch to values stored in the memory of the TCM and an operation to switch to values stored in the memory of the precoder are performed at the same time.*

*12. The trellis encoder as recited in claim 11, wherein the operation to switch to values stored in the memory of the TCM and the operation to switch to values stored in the memory of the precoder are performed with a temporal regularity.*

*13. A trellis encoder initialization method, comprising:*

*creating a first feedback loop in a precoder by switching a content of a memory of the precoder to an input of the*

*precoder where the feedback loop is created to initialize memory of the precoder after receiving values stored in the memory of the precoder from a first switching unit; and*

*creating a second feedback loop in a trellis coded modulation (TCM) encoder by switching the content of the memory of the TCM encoder to an input of the TCM encoder where the second feedback loop is created to initialize memory of the TCM encoder after receiving values stored in the memory of the TCM encoder from a second switching unit; and*

*wherein when memory of the precoder is initialized by the first feedback loop, the TCM encoder generates two initialization symbols in a predetermined data field period.*

*14. The method as recited in claim 13, wherein the content of each memory starts to be initialized as the first and the second feedback loops are created.*

*15. The method as recited in claim 14, wherein the two switching units are operated at the same time.*

*16. The method as recited in claim 15, wherein the two switching units are operated with a temporal regularity.*

*17. A digital broadcasting system including a switchable trellis encoder, the encoder comprising:*

*a precoder which includes one memory;*

*a trellis coded modulation (TCM) encoder which includes two memories; where the trellis encoder is configured to generate initialization symbols of a predetermined length in a predetermined data field period M and synchronize a*

*transport stream outputted to receiving stations, and M is a natural number, wherein the trellis encoder includes:*

*a first switching unit for initializing output values of the trellis coded modulation (TCM) encoder and the memory of the TCM encoder performing switching to values stored in the memory of the TCM encoder instead of input signals to the TCM encoder every M period, wherein the TCM encoder includes a first feedback loop to initialize the memory of the TCM encoder after receiving the values stored in the memory of the TCM encoder from the first switching unit;*

*a second switching unit for initializing output values of the precoder and the memory of the precoder by performing switching to values stored in the memory of the precoder instead of input signals to the precoder every M period, wherein the precoder includes a second feedback loop to initialize the memory of the precoder after receiving the values stored in the memory of the precoder from the second switching unit; and*

*wherein when the memory of the precoder is initialized by the second feedback loop, the trellis encoder generates two initialization symbols in the predetermined data field period M.*

*18. The digital broadcasting system as recited in claim 17, wherein contents of the memories start to be initialized to zero as the first switching unit switches the content of the memory of the precoder and the second switching unit switches content of one of the memories of the TCM encoder.*

*19. The digital broadcasting system as recited in claim 18, wherein an operation to switch to values stored in the memory of the TCM and an operation to switch to values stored in the memory of the precoder are performed at the same time.*

*20. The digital broadcasting system as recited in claim 19, wherein the operation to switch to values stored in the memory of the TCM and the operation to switch to values stored in the memory of the precoder are performed with a temporal regularity.*

* * * * *